(12) United States Patent
Miller et al.

(10) Patent No.: US 8,732,667 B2
(45) Date of Patent: May 20, 2014

(54) DEBUGGING SERVICES FOR DOMAIN SPECIFIC LANGUAGES

(75) Inventors: David Michael Miller, Seattle, WA (US); David Patrick Wolfe, Lawrence, KS (US); Neil Alexander MacIntosh, Bothell, WA (US); Quetzalcoatl Bradley, Monroe, WA (US); Giovanni Della-Libera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 12/618,320

(22) Filed: Nov. 13, 2009

(65) Prior Publication Data
US 2011/0119654 A1     May 19, 2011

(51) Int. Cl.
*G06F 9/44*     (2006.01)
(52) U.S. Cl.
USPC .......................................... 717/125; 717/127
(58) Field of Classification Search
USPC ............ 717/124–135; 709/220–231; 707/766
See application file for complete search history.

(56) References Cited

U.S. PATENT DOCUMENTS

| | | | | |
|---|---|---|---|---|
| 5,410,648 | A * | 4/1995 | Pazel | 717/124 |
| 6,041,330 | A * | 3/2000 | Carman et al. | 1/1 |
| 6,412,106 | B1 * | 6/2002 | Leask et al. | 717/124 |
| 6,473,896 | B1 * | 10/2002 | Hicken et al. | 717/132 |
| 6,915,509 | B1 | 7/2005 | Chkodrov | |
| 7,299,454 | B2 * | 11/2007 | Pugh et al. | 717/125 |
| 7,392,509 | B2 * | 6/2008 | Sinha et al. | 717/126 |
| 7,870,540 | B2 * | 1/2011 | Zare et al. | 717/126 |
| 7,912,935 | B2 * | 3/2011 | Merissert-Coffinieres et al. | 709/223 |
| 2003/0121026 | A1 * | 6/2003 | Wang et al. | 717/124 |
| 2004/0009813 | A1 * | 1/2004 | Wind | 463/30 |
| 2004/0031030 | A1 * | 2/2004 | Kidder et al. | 717/172 |
| 2004/0088688 | A1 * | 5/2004 | Hejlsberg et al. | 717/143 |
| 2004/0205728 | A1 * | 10/2004 | Hanson | 717/129 |
| 2005/0071813 | A1 * | 3/2005 | Reimer et al. | 717/125 |
| 2005/0081192 | A1 * | 4/2005 | DeLine et al. | 717/126 |
| 2006/0168515 | A1 * | 7/2006 | Dorsett et al. | 715/513 |
| 2006/0288332 | A1 * | 12/2006 | Sagar et al. | 717/124 |
| 2007/0083644 | A1 * | 4/2007 | Miller et al. | 709/224 |
| 2008/0155512 | A1 * | 6/2008 | Bates et al. | 717/131 |
| 2008/0189323 | A1 * | 8/2008 | Chang et al. | 707/102 |

(Continued)

OTHER PUBLICATIONS

"Debugging Domain-Specific Languages in Eclipse" published 2006 by Hui Wu, Jeff Gray, and Marjan Mernik. http://www.gray-area.org/Pubs/ddf.pdf.*

(Continued)

*Primary Examiner* — Satish Rampuria
(74) *Attorney, Agent, or Firm* — Workman Nydegger

(57) ABSTRACT

A computer system displays an interactive development environment including a domain specific language (DSL) grammar input receiving area that allows the user to view and interact with DSL grammar inputs, a DSL language input receiving area that allows the user to view and interact with DSL language inputs and a parse output area that allows the user to view the current state of the DSL parser. The computer system begins stepping through each DSL language input to determine whether the DSL language inputs have created an error relative to the DSL grammar. The computer system also presents the resulting output for each DSL language input, so that as the user provides subsequent step inputs, the interactive development environment successively steps through each DSL language input and presents, at each step, the DSL grammar inputs, the DSL language inputs and the corresponding output in the parse output area.

23 Claims, 5 Drawing Sheets

(56) References Cited

U.S. PATENT DOCUMENTS

2008/0295078 A1    11/2008  Stall
2008/0313071 A1*   12/2008  Hughes et al. ............... 705/37
2008/0313616 A1*   12/2008  Malcolm ...................... 717/127
2009/0186689 A1*   7/2009   Hughes et al. ............... 463/25
2009/0222799 A1*   9/2009   Stewart et al. ............... 717/143

OTHER PUBLICATIONS

"TIDE: A Generic Debugging Framework—Tool Demonstration—" published 2005 by M.G.J. van den Brand, B. Cornelissen, P.A. Olivier, J.J. Vinju. http://www.st.ewi.tudelft.nl/~cornel/pub/LDTA05.pdf.*

"Interface XMLStreamReader" published 2007. http://docs.oracle.com/javaee/5/api/javax/xml/stream/XMLStreamReader.html.*

Wu et al.; Grammar-Driven Generation of Domain-Specific Language Debuggers—Published Date: 2008 http://www.mpirt.org/gray/pubs/spe-hui.pdf.

Author Unknown; About Domain-Specific Languages—Published Date: Jul. 2008 http://msdn.microsoft.com/en-us/library/bb126278.aspx.

Wu et al.; Debugging Domain-Specific Languages in Eclipse—Published Date: 2005 http://www.gray-area.org/Pubs/ddf.pdf.

Wu et al.; Weaving a Debugging Aspect into Domain-Specific Language Grammars—Published Date: 2005 http://grid.cis.uab.edu/gray/pubs/sac-2005-hui.pdf.

Mernick et al.; LISA: An Interactive Environment for Programming Language Development—Published: 2002 http://labraj.uni-mb.si/lisa/publications/CC2002.pdf.

Author Unknown; A Look into Domain Specific Languages—Published: Aug. 15, 2009 http://lostintentions.com/2009/08/15/a-look-into-domain-specific-languages/.

Van Den Brand; TIDE: A Generic Debugging Framework—Tool Demonstration—Published: 2005 http://www.st.ewi.tudelft.nl/~cornel/pub/LDTA05.pdf.

* cited by examiner

DEBUGGING SERVICES FOR DOMAIN SPECIFIC LANGUAGES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a software application may be designed to debug other software applications or code portions. Such applications are typically referred to as debuggers. Debuggers provide a view of the software code as it is being executed, allowing software developers to see what is happening at each stage of the program execution. Debuggers also detect and present errors to the developer during execution.

Other software applications may be used to actually define a software language. For instance, developers often develop software programs that are specific to a given domain. Such applications are often written in computer languages that are also specific to that given domain. Some software applications allow developers to define such languages and then implement those languages when writing the domain-specific programs.

BRIEF SUMMARY

Embodiments described herein are directed to providing debugging functionality for debugging a domain specific language within an interactive development environment. In one embodiment, a computer system displays an interactive development environment including a domain specific language (DSL) grammar input receiving area that allows the user to view and interact with DSL grammar inputs, a DSL language input receiving area that allows the user to view and interact with DSL language inputs and a parse output area that allows the user to view the current state of the DSL parser. The computer system receives a step input from the user indicating that the interactive development environment is to begin stepping through each DSL language input to determine whether the DSL language inputs have created an error relative to the DSL grammar that defines acceptable DSL language inputs. The computer system also presents the resulting output for each DSL language input, so that as the user provides subsequent step inputs, the interactive development environment successively steps through each DSL language input and presents, at each step, the DSL grammar inputs, the DSL language inputs and the corresponding output in the parse output area.

In another embodiment, a computer system instantiates an interactive development environment configured for dynamically presenting at least a domain specific language (DSL) grammar input receiving area, a DSL language input receiving area and a parse output area, wherein the interactive development environment allows a user to step through each language input and observe the resulting output for each input while designing the DSL itself. The computer system receives an indication from the user indicating that the interactive development environment is to begin debugging at an indicated point in the DSL language input and receives inputs from a user indicating that breakpoints are to be added at both an indicated point in the DSL language inputs and at an indicated point in the DSL grammar input receiving area.

The computer system analyzes the DSL language inputs in the DSL language input receiving area to determine whether the inputs up to the DSL language input breakpoint have created an error relative to the DSL grammar that defines acceptable DSL language inputs, where the DSL language input analysis is stopped before reaching the DSL language input breakpoint if the DSL grammar breakpoint is reached beforehand. The computer system also presents the resulting output for each language input up to the first-reached breakpoint, so that as the user provides subsequent step inputs, the interactive development environment successively steps through each input and presents its corresponding output up to the next DSL language input or DSL grammar breakpoint.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
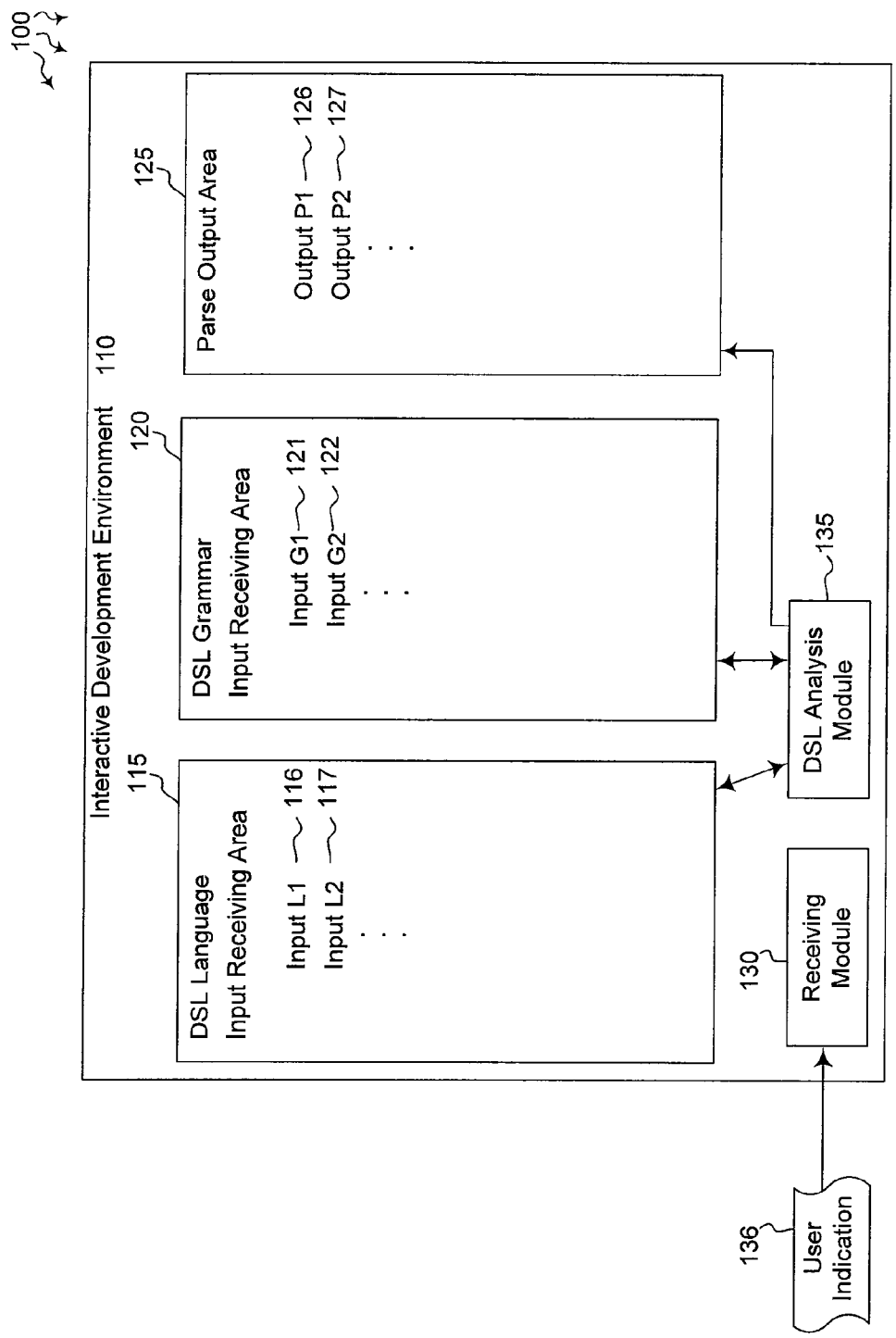
FIG. 1 illustrates a computer architecture in which embodiments of the present invention may operate including providing debugging functionality for debugging a domain specific language within an interactive development environment.

Embodiments described herein are directed to providing debugging functionality for debugging a domain specific language within an interactive development environment. In one embodiment, a computer system displays an interactive development environment including a domain specific language (DSL) grammar input receiving area that allows the user to view and interact with DSL grammar inputs, a DSL language input receiving area that allows the user to view and interact with DSL language inputs and a parse output area that allows the user to view the current state of the DSL parser. The computer system receives a step input from the user indicating that the interactive development environment is to begin stepping through each DSL language input to determine whether the DSL language inputs have created an error relative to the DSL grammar that defines acceptable DSL language inputs. The computer system also presents the resulting output for each DSL language input, so that as the user provides subsequent step inputs, the interactive development environment successively steps through each DSL language input and presents, at each step, the DSL grammar inputs, the DSL language inputs and the corresponding output in the parse output area.

In another embodiment, a computer system instantiates an interactive development environment configured for dynamically presenting at least a domain specific language (DSL) grammar input receiving area, a DSL language input receiving area and a parse output area, wherein the interactive development environment allows a user to step through each language input and observe the resulting output for each input while designing the DSL itself. The computer system receives an indication from the user indicating that the interactive development environment is to begin debugging at an indicated point in the DSL language input and receives inputs from a user indicating that breakpoints are to be added at both an indicated point in the DSL language inputs and at an indicated point in the DSL grammar input receiving area.

The computer system analyzes the DSL language inputs in the DSL language input receiving area to determine whether the inputs up to the DSL language input breakpoint have created an error relative to the DSL grammar that defines acceptable DSL language inputs, where the DSL language input analysis is stopped before reaching the DSL language input breakpoint if the DSL grammar breakpoint is reached beforehand. The computer system also presents the resulting output for each language input up to the first-reached breakpoint, so that as the user provides subsequent step inputs, the interactive development environment successively steps through each input and presents its corresponding output up to the next DSL language input or DSL grammar breakpoint.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes an interactive development environment 110. Interactive development environment (IDE) 110 may comprise any type of development environment in which a user develops, writes and/or tests software code. IDE 110 may comprise a single application or may comprise multiple different applications, where each application is designed to perform a highly specific task. IDE 110 may be presented to a user so that the user can provide inputs for the program. These inputs may include those shown in FIG. 1 and, additionally or alternatively, may include other inputs not shown in FIG. 1.

In the embodiment illustrated in FIG. 1, IDE 110 includes multiple different displayed areas. One of these displayed areas is the DSL language input receiving area 115 (or "area 115" hereinafter). Area 115 may be configured to receive inputs L1 (116), L2 (117) or other inputs as noted by the downward ellipsis. As explained above, a developer may input text that is to be displayed according to the grammar defined in DSL grammar input receiving area 120. Thus, a developer may define a domain specific language using grammar inputs G1 (121), G2 (122) and/or any additional grammar inputs, and provide text inputs based on the defined DSL grammar. Accordingly, each of areas 115 and 120 are designed to receive and display inputs received from a user. Moreover these input areas may be further designed to display errors determined by DSL analyzing module 135.

DSL analyzing module 135 may be configured to analyze input L1 and other DSL language inputs against the DSL grammar that defines the domain specific language itself. This analysis may be performed dynamically, in real-time.

IDE 110 also includes parse output area 125. Parse output area 125 may be configured to display various parser outputs including output P1 (126), output P2 (127) and any other parser outputs. The parser outputs are designed to show to the user how the DSL language inputs are being parsed. Along those lines, parse output area 125 provides the current state of the parser at each step of the debugging process. Thus, for example, a user may provide an indication 136 that IDE 110 is to begin debugging at the beginning of the DSL language inputs (or at some other arbitrary position in the language or the grammar inputs). In some embodiments, the debugging may only move forward incrementally, with a user providing an indication of when the debugger (IDE 110) is to step to the next portion of text or code. Accordingly, a user may define a DSL using DSL grammar in area 120, input DSL language in area 115 and see the parse output in area 125 as the user incrementally steps through the debugging process. This will be explained in greater detail below with regard to method 200 of FIG. 2 below.

Figure 2:
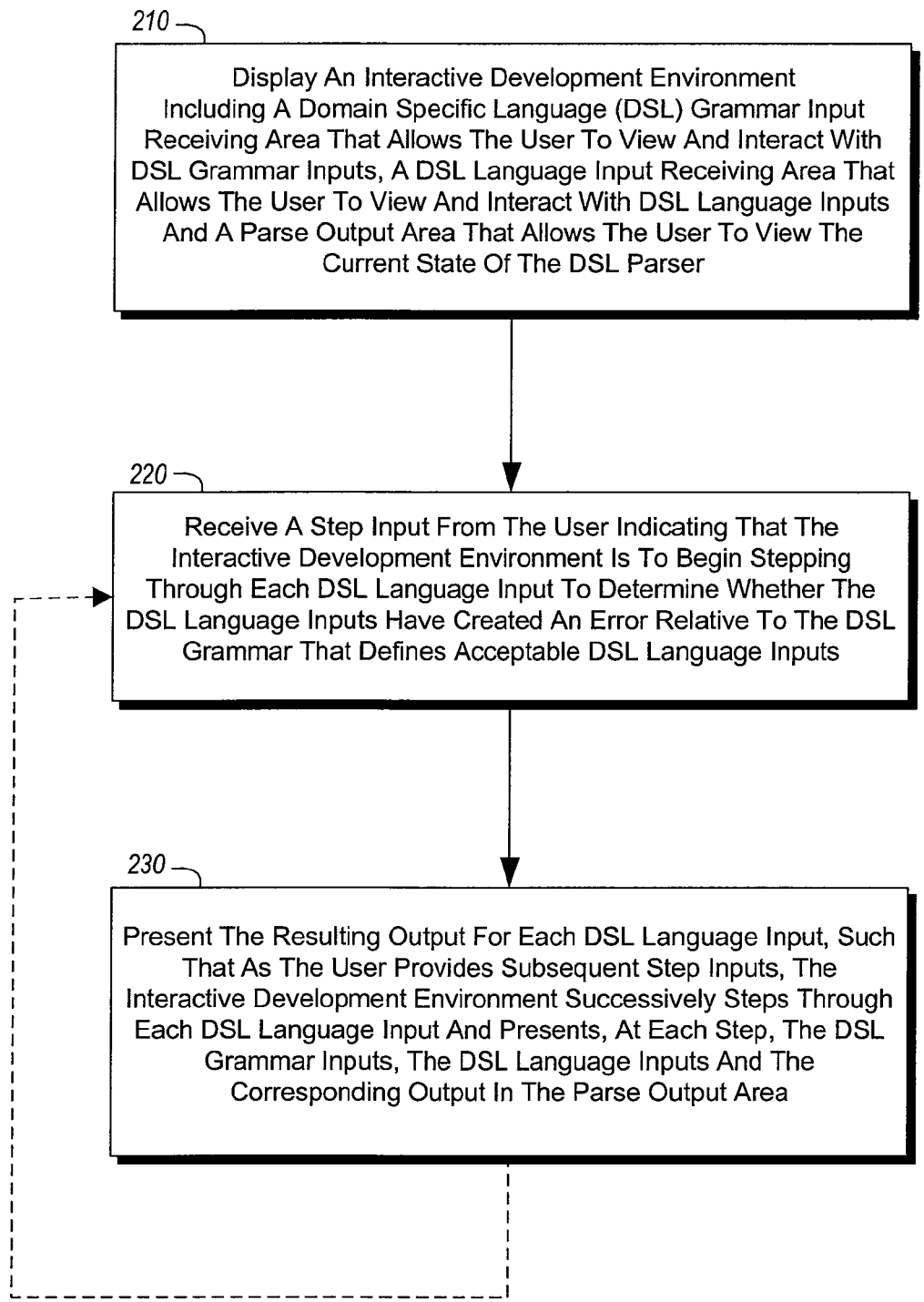
FIG. 2 illustrates a flowchart of an example method for providing debugging functionality for debugging a domain specific language within an interactive development environment.
Figure 3:
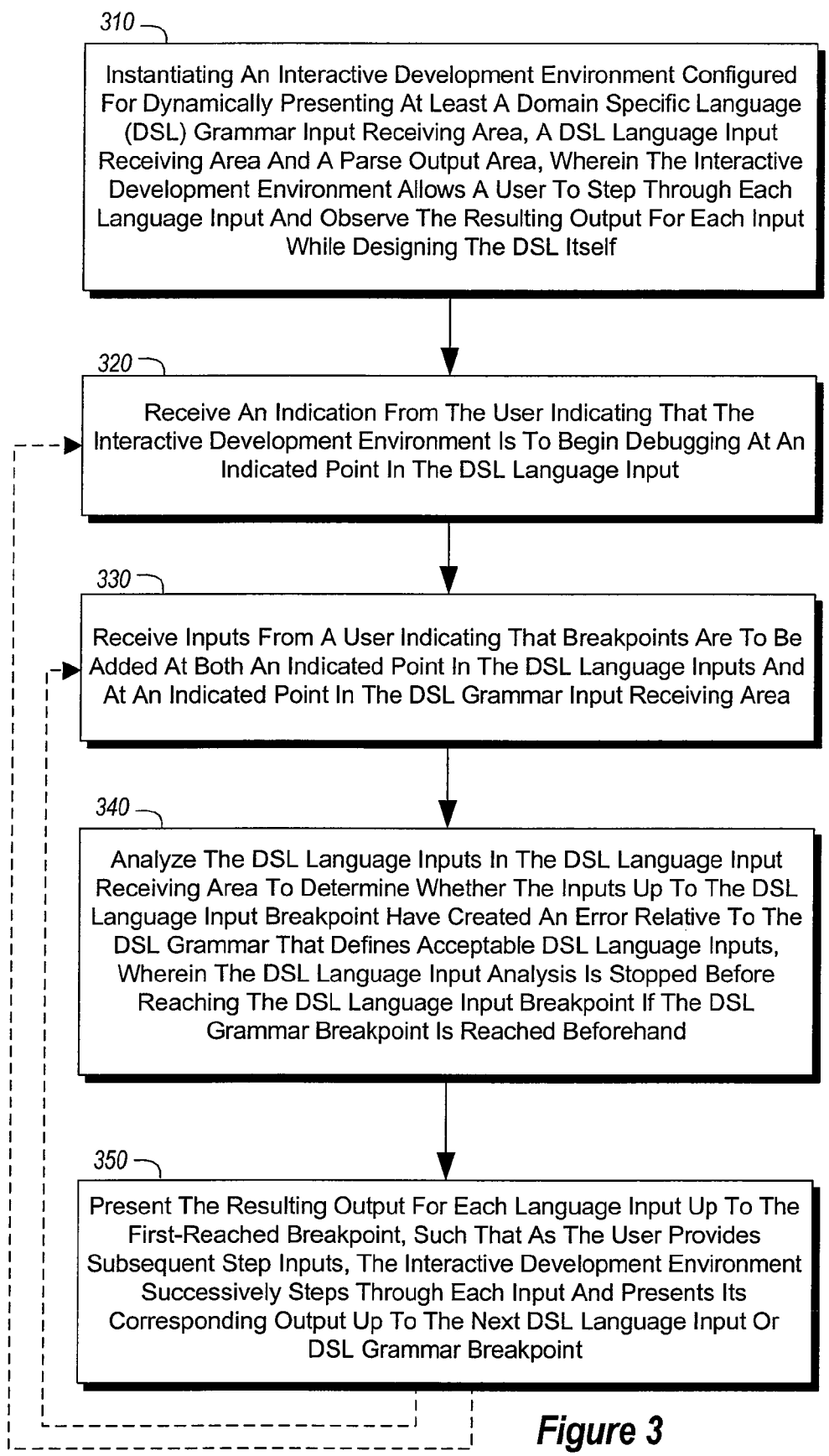
FIG. 3 illustrates a flowchart of an example method for providing debugging functionality for a domain specific language within an interactive development environment.
Figure 5:
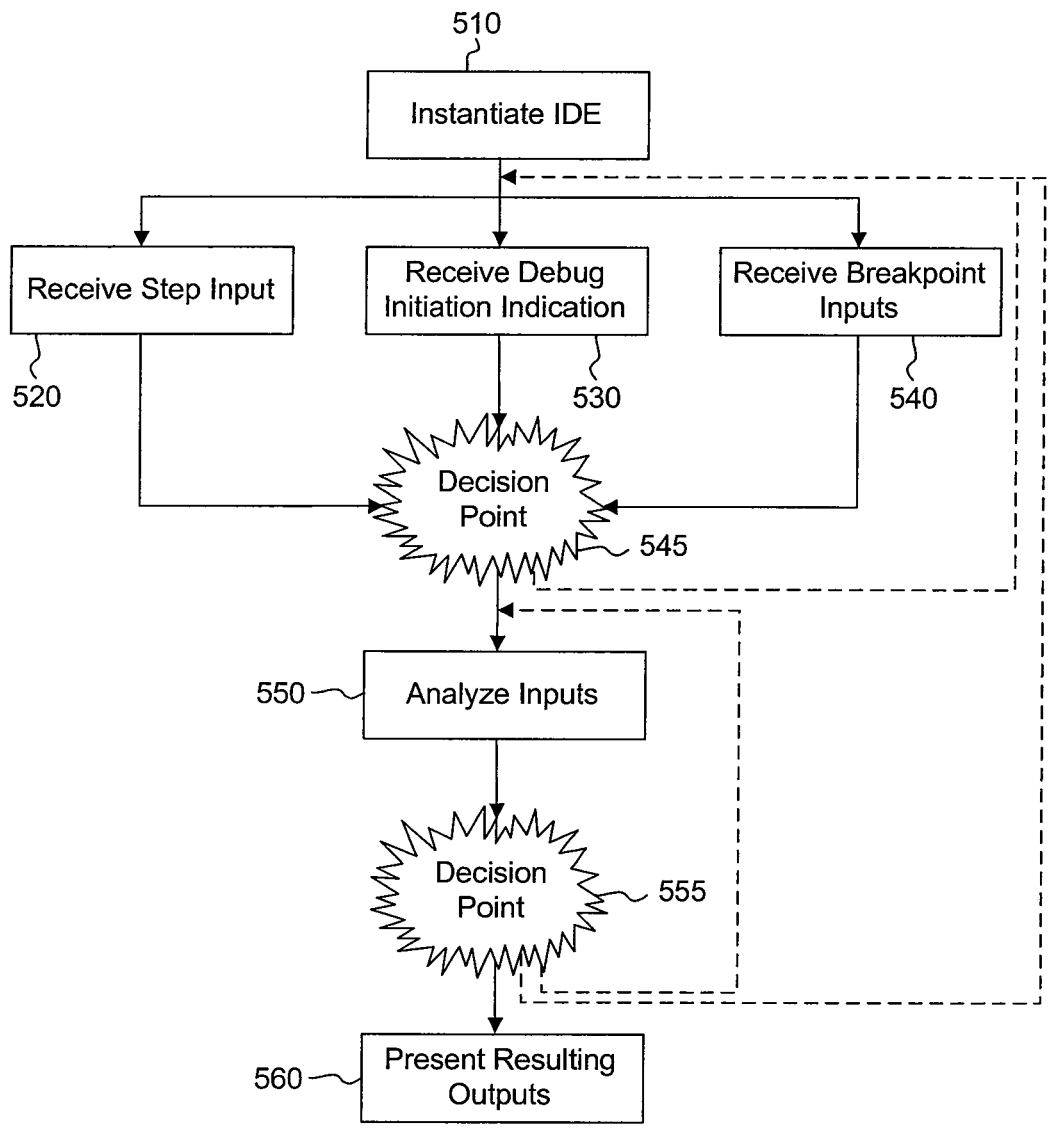
FIG. 5 illustrates a flowchart including an example method for providing debugging functionality for debugging a domain specific language within an interactive development environment.

In view of the systems and architectures described above, methodologies that may be implemented in accordance with the disclosed subject matter will be better appreciated with reference to the flow charts of FIGS. 2, 3 and 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing debugging functionality for debugging a domain specific language within an interactive development environment. The method 200 will now be described with frequent reference to the components and data of environments 100 of FIG. 1 and 400 of FIG. 4.

Method 200 includes an act of displaying an interactive development environment including a domain specific language (DSL) grammar input receiving area that allows the user to view and interact with DSL grammar inputs, a DSL language input receiving area that allows the user to view and interact with DSL language inputs and a parse output area that allows the user to view the current state of the DSL parser (act 210). For example, a computer system may display IDE 110 that includes DSL grammar input receiving area 120 that allows the user to view and interact with DSL grammar inputs, DSL language input receiving area 115 that allows the user to view and interact with DSL language inputs and parse output area 125 that allows the user to view the current state of the DSL parser.

In some embodiments, each of the DSL grammar input receiving area, the DSL language input receiving area and the parse output area are displayed simultaneously. In some cases, the three areas may be each comprise a portion of an application window and may be arranged adjacent to each other, such that the user can more easily view the outcome of a given input. It should be noted that more or fewer input/output areas may be presented as part of IDE 110. For instance, an additional output area may be displayed that includes a representation of the parsing path taken by the DSL parser. By identifying the parsing path, the user may more easily debug the DSL itself or the DSL language inputs.

Figure 4:
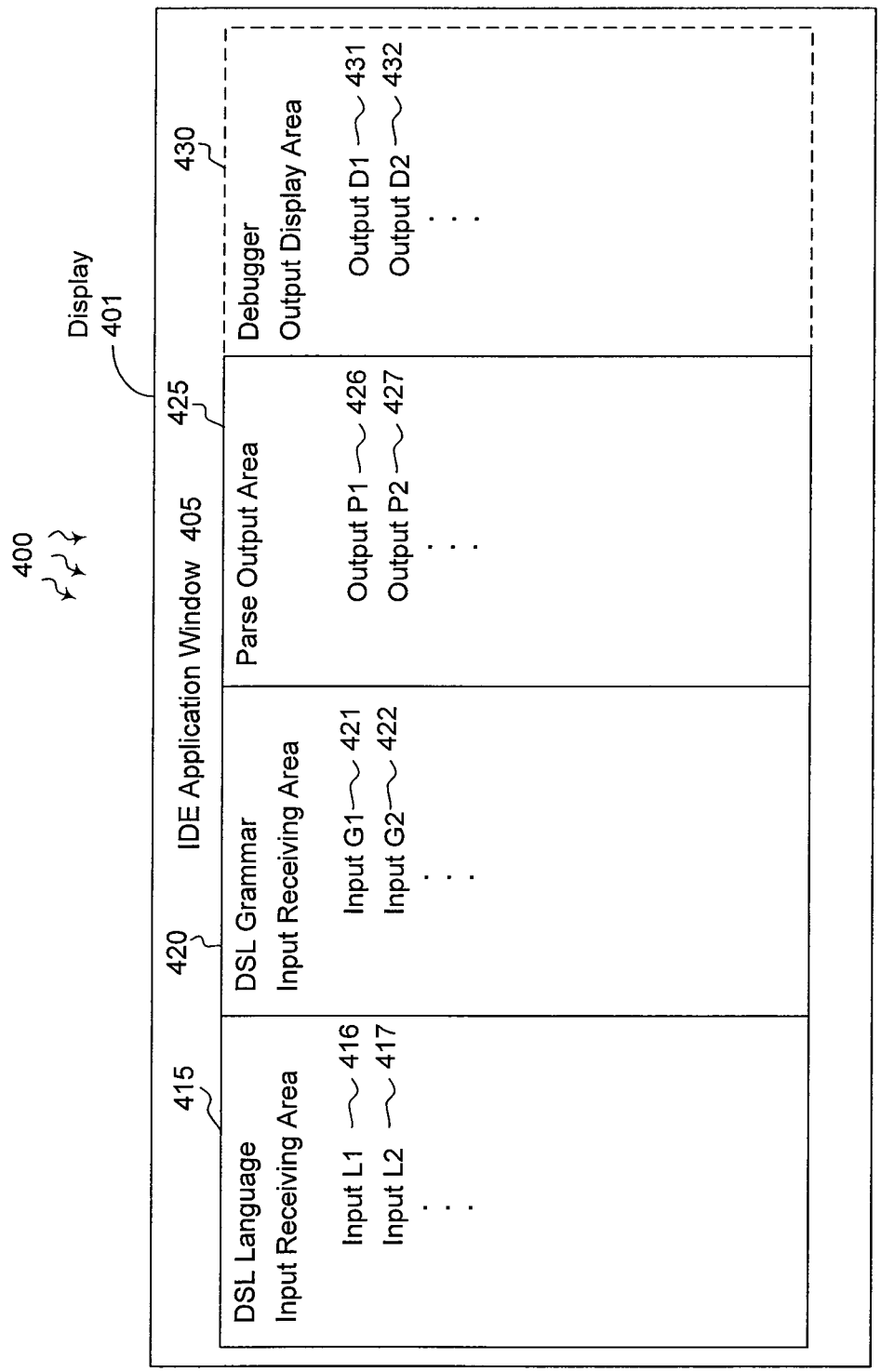
FIG. 4 illustrates an embodiment of the present invention that includes an IDE application window.

FIG. 4 shows a display 401 with an IDE application window 405 that includes such an additional output area. Debugger output display area 430 may be displayed alone or in addition to DSL grammar input receiving area 415, DSL language input receiving area 420 and parse output area 425. Debugger output display area may display a representation of the parsing path taken by the DSL parser. Using this parsing path, a user or developer may more easily see how a particular rule was applied or a particular result was achieved. Thus, in the scenario illustrated in FIG. 4, a user may define a DSL using DSL grammar inputs G1 (421), G2 (422) and others, may write code or other text against the DSL using language inputs L1 (416) and L2 (417) and others, may view the current state of the parser in outputs P1 (426) and P2 (427) and others, and may view the parsing path taken by the parser in debugger outputs D1 (431) and D2 (432) and others. It should be noted that while the inputs and outputs are shown in list form, the inputs/outputs may be in tree form, line form or in any other format configured for presenting information to a user.

Method 200 also includes an act of receiving a step input from the user indicating that the interactive development environment is to begin stepping through each DSL language input to determine whether the DSL language inputs have created an error relative to the DSL grammar that defines acceptable DSL language inputs (act 220). For example, receiving module 130 may receive a step input 136 from a user indicating that IDE 100 (or more specifically DSL analyzing module 135) is to begin stepping through each DSL language input (e.g. 116) to determine whether the DSL language inputs have created or resulted in an error relative to the DSL grammar (e.g. inputs 121, 122) that defines acceptable DSL language inputs. As mentioned above, software developers often create domain specific languages for use in a given domain. The DSL grammar defines the tokens, text and syntax of the DSL. Thereafter, the developer (or another user) can write a program against the newly created domain specific language. These inputs are then parsed and the parse outputs are displayed in parse output area 125.

In some embodiments, the DSL language inputs are analyzed dynamically in real-time such that as the DSL language inputs are received, inputs causing errors are promptly identified. Thus, a user can provide DSL language inputs and have immediate (or substantially immediate) feedback regarding the inputs. Moreover, the user can see how the parser analyzed the inputs (in the parse output area) and what led to the errors (if any). In such cases, the parse outputs are also dynamically updated as inputs are received, such that the parse output area is updated each time a change is made to a DSL language input. It is also noteworthy that the error analysis performed by the DSL analyzing module 135 may be driven solely by the DSL grammar without any additional annotations in the grammar or the language input. Thus, the developer does not have to worry about providing special debugging annotations in either the DSL grammar or in the DSL language inputs. Rather, the debugging may be performed solely by analyzing the DSL grammar.

Software developers may also benefit from using breakpoints within IDE 110. An IDE user may indicate that a breakpoint is to be added at an indicated point in the DSL language inputs (e.g. 117). In such cases, the DSL analyzing module 135 may begin debugging and continue running up to the added breakpoint. Breakpoints may also be added to the DSL grammar. Accordingly, when breakpoints have been added to both the DSL language inputs and the DSL grammar, the DSL analyzing module may begin debugging and continue debugging until hitting a breakpoint in either the DSL grammar or the DSL language inputs, wherever the first breakpoint is hit. Thus, the analyzer will stop regardless of where in the DSL language input receiving area the parser is parsing the DSL language inputs. Moreover, at each breakpoint, the user may view the current state of the parser in parse output area 125 to determine why and where a given rule is being applied.

Method 200 further includes an act of presenting the resulting output for each DSL language input, such that as the user provides subsequent step inputs, the interactive development environment successively steps through each DSL language input and presents, at each step, the DSL grammar inputs, the DSL language inputs and the corresponding output in the parse output area (act 230). For example, parse output area 125 may present the resulting output for each DSL language input, so that as a user steps through the DSL language inputs, IDE 110 presents, at each step, the DSL grammar inputs (e.g. 121, 122), the DSL language inputs (e.g. 116, 117) and the corresponding output (e.g. 126, 127) in the parse output area. The resulting output may indicate why and where a particular DSL grammar rule is being applied for each DSL language input. This information may then assist the developer in making changes that result in the correct output. After presenting the resulting output, the method 200 may return to previous acts including act 220 and continue in this manner as new inputs are received.

IDE 110 may also be configured to display within the input text in the DSL language input receiving area the current location of the parser. The current location may be highlighted using a background color, font change or other highlighting mechanism. Breakpoints may similarly be highlighted in the language inputs as well as the grammar inputs. Accordingly, the DSL developer may be continually apprised of where the code is being processed and what is happening at each step in the parser.

The parser outputs (e.g. 126/127) may be arranged in various different ways. For instance, the parse outputs may be presented as a bottom-up element tree representation in the parse output area 125, where each element parsed by the parser is presented to the user as it is encountered by the parser. Thus, the parse view may appear as it appears to the parser. Allowing the user to see the parsed text as the parser sees it may provide additional insights as to why a certain result is being achieved or not achieved. Moreover, the parse outputs may be presented as a top-down element tree in the parse output area, where each element parsed by the parser is presented to the user in a human-readable, top-down manner. Allowing the user to see the parsed text in a more human-readable form may provide insights that are not as readily apparent in the bottom-up view. Accordingly, as each view provides various benefits and tradeoffs, the user may determine which view is shown and may change between views dynamically during the debugging process.

FIG. 3 illustrates a flowchart of a method 300 for providing debugging functionality for a domain specific language within an interactive development environment. The method 300 will now be described with frequent reference to the components and data of environment 100.

Method 300 includes an act of instantiating an interactive development environment configured for dynamically presenting at least a domain specific language (DSL) grammar input receiving area, a DSL language input receiving area and a parse output area, wherein the interactive development environment allows a user to step through each language input and observe the resulting output for each input while designing the DSL itself (act 310). For example, a computer system may instantiate IDE 110 which is configured for dynamically presenting DSL grammar input receiving area 120, DSL language input receiving area 115 and parse output area 125. IDE 110 allows a user to step through each DSL language input and observe the resulting output for each input while designing the DSL itself. Thus, as explained above, an environment is provided where a user can design a DSL, write code against the DSL and step through the code and see the resulting output at each step.

Method 300 also includes an act of receiving an indication from the user indicating that the interactive development environment is to begin debugging at an indicated point in the DSL language input (act 320). For example, receiving module 130 may receive user indication 136 indicating that IDE 110 is to begin debugging at an indicated point in the DSL language inputs (e.g. 116, 117). Thus, the IDE may begin debugging at the start of the language inputs or at some indicated position within the language inputs.

Method 300 includes an act of receiving inputs from a user indicating that breakpoints are to be added at both an indicated point in the DSL language inputs and at an indicated point in the DSL grammar input receiving area (act 330). For example, one or more breakpoints may be added among the DSL language inputs and among the DSL grammar inputs. These breakpoints indicate where the debugging is to stop, regardless of where the parser is in relation to the DSL inputs or to the DSL grammar inputs. Accordingly, the debugging stops at the next-reached breakpoint, whether the breakpoint is in the DSL language inputs or in the DSL grammar.

Method 300 includes an act of analyzing the DSL language inputs in the DSL language input receiving area to determine whether the inputs up to the DSL language input breakpoint have created an error relative to the DSL grammar that defines acceptable DSL language inputs, wherein the DSL language input analysis is stopped before reaching the DSL language input breakpoint if the DSL grammar breakpoint is reached beforehand (act 340). For example, DSL analyzing module 135 may analyze DSL language inputs 116/117 to determine whether the inputs up to the DSL language input breakpoint have created an error relative to the DSL grammar that defines acceptable DSL language inputs. However, as mentioned above, the DSL language input analysis may be stopped before reaching the DSL language input breakpoint if one of the DSL grammar breakpoints is reached beforehand.

Method 300 includes an act of presenting the resulting output for each language input up to the first-reached breakpoint, such that as the user provides subsequent step inputs, the interactive development environment successively steps through each input and presents its corresponding output up to the next DSL language input or DSL grammar breakpoint (act 350). For example, IDE 110 may present the resulting output for each DSL language input up to the first-reached breakpoint in the parse output area 125, so that as the developer provides step inputs to step through the various inputs, the IDE successively steps through each input and presents its corresponding output up to the next DSL language input breakpoint or to the next DSL grammar breakpoint.

As explained above with regard to the method of FIG. 2, the parser outputs (e.g. 126/127) may similarly be arranged in various different ways. For instance, the parse outputs may be presented as a bottom-up element tree representation in the parse output area 125, where each element parsed by the parser is presented to the user as it is encountered by the parser. Thus, the parse view may appear as it appears to the parser. Allowing the user to see the parsed text as the parser sees it may provide additional insights as to why a certain result is being achieved or not achieved. Moreover, the parse outputs may be presented as a top-down element tree in the parse output area, where each element parsed by the parser is presented to the user in a human-readable, top-down manner. Allowing the user to see the parsed text in a more human-readable form may provide insights that are not as readily apparent in the bottom-up view. Accordingly, as each view provides various benefits and tradeoffs, the user may determine which view is shown and may change between views dynamically during the debugging process.

As with FIG. 2, after presenting the resulting output, the method 300 may return to previous acts including acts 320, 330 (or any other act) and continue processing as new inputs are received. It should also be noted that a user may be able to modify breakpoints during debugging. Accordingly, a user may be able to add, delete, move or otherwise change the breakpoints in either (or both of) the DSL language inputs and the DSL grammar inputs.

In some embodiments, decision points may be introduced throughout the debugging process. As illustrated in FIG. 5, decisions points may be introduced between steps so as to provide the user with choices pertaining to the debugging process. For instance, a method may start with instantiating an IDE (510), similar to act 310 of FIG. 3. The IDE may receive inputs such as step inputs 520 (similar to act 220 of FIG. 2), debug initiation indications 530 (similar to act 320 of FIG. 3), breakpoint inputs (similar to act 330 of FIG. 3) and other inputs. Some of the received inputs may cause the IDE to present a prompt or other mechanism allowing the user to provide input at decision point 545. The user may provide input on where the breakpoints should be added, how many steps to step at a time, when to apply a certain update or any other type of decision input.

Continuing in FIG. 5, the IDE may analyze the DSL and other inputs at 550 (similar to act 340 of FIG. 3). Again, a decision point 555 may be introduced to allow the user to provide input regarding the debugging process. Such input, as indicated by the dotted lines, may lead the process back to various execution points in the method. These inputs may affect how inputs are analyzed, displayed or otherwise processed. After decision point 555, IDE may present the resulting outputs at 560 (similar to act 350 of FIG. 3). It should also be noted that while decision points are shown at points 545 and 555 in FIG. 5, more or fewer decision points may be introduced at any point in the debugging process.

Accordingly, an integrated development environment is provided that allows a software developer to view DSL grammar inputs, DSL language inputs, the current state of the DSL parser and/or the parse path taken. Moreover, the IDE allows the developer to make changes to the grammar or language inputs and immediately see how the changes are interpreted by the parser. Then, based on that immediate feedback, the developer can make appropriate changes to the inputs to obtain the desired outputs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and system memory, a computer-implemented method for providing debugging functionality for debugging a programming language within an interactive development environment, the method comprising:

an act of displaying an interactive development environment including a programming language grammar input receiving area that allows a user to view and interact with grammar inputs defining a particular programming language, a programming language input receiving area that allows the user to view and interact with programming language inputs that use the particular programming language as defined by the grammar inputs, and a parse output area that allows the user to view the current state of a parser, wherein the grammar input receiving area, the language input receiving area, and the parse output area are each displayed simultaneously;

an act of receiving a step input from the user indicating that the interactive development environment is to begin stepping through each language input to determine whether the language inputs have created an error relative to the grammar that defines acceptable language inputs; and an act of presenting the resulting output for each language input, such that as the user provides subsequent step inputs, the interactive development environment successively steps through each language input and simultaneously presents, at each step:

an indication within the language input receiving area of a present language input that is being parsed by the parser, an indication within the grammar input receiving area of at least one grammar rule that is being applied to the present language input, the indication visually distinguishing the at least one grammar rule that is being applied to the present language input from other grammar inputs, and corresponding output in the parse output area.

2. The method of claim 1, wherein the presented corresponding output indicates why at least one present grammar rule is being applied to a corresponding present language input.

3. The method of claim 1, wherein the parse output area presents a representation of the current state of the parser.

4. The method of claim 3, further comprising presenting an additional output area that includes a representation of the parsing path taken by the parser.

5. The method of claim 1, further comprising displaying within the input text in the language input receiving area the current location of the parser.

6. The method of claim 1, wherein the language inputs are analyzed dynamically in real-time such that as the language inputs are received, inputs causing errors are promptly identified.

7. The method of claim 6, wherein parse outputs are dynamically updated as inputs are received, such that the parse output area is updated each time a change is made to a language input.

8. The method of claim of claim 1, further comprising receiving an input from a user indicating that a breakpoint is to be added at an indicated point in the language inputs.

9. The method of claim 1, further comprising receiving an input from a user indicating that a breakpoint is to be added at an indicated point in the grammar input receiving area.

10. The method of claim 9, further comprising stopping the parser at the breakpoint added to the grammar input receiving area regardless of where in the language input receiving area the parser is parsing the language inputs.

11. The method of claim 1, wherein error analysis is driven solely by the grammar without any additional annotations in the grammar or the language input.

12. The method of claim 1, further comprising presenting a bottom-up element tree representation of the parser output in the parse output area, wherein each element parsed by the parser is presented to the user as it is encountered by the parser.

13. The method of claim 1, further comprising presenting a top-down element tree representation of the parser output in the parse output area, wherein each element parsed by the parser is presented to the user in a human-readable, top-down manner.

14. A computer system comprising the following:
one or more processors;
system memory; and
one or more computer-readable storage media having stored thereon computer-executable instructions that, when executed by the one or more processors, cause the computer system to perform a method for providing debugging functionality for a programming language within an interactive development environment, the method comprising the following:
an act of instantiating an interactive development environment configured for dynamically presenting at least a programming language grammar input receiving area that allows a user to view and interact with grammar inputs defining a particular programming language, a programming language input receiving area that allows a user to view and interact with programming language inputs that use the particular programming language as defined by the grammar inputs, and a parse output area, wherein the interactive development environment allows a user to step through each language input and observe the resulting output for each input while designing the particular programming language itself, and wherein the grammar input receiving area, the language input receiving area, and the parse output area are each displayed simultaneously;

an act of receiving an indication from the user indicating that the interactive development environment is to begin debugging at an indicated point in the language input;
an act of receiving inputs from a user indicating that breakpoints are to be added at both an indicated point in the language inputs and at an indicated point in the grammar input receiving area;
an act of analyzing the language inputs in the language input receiving area to determine whether the inputs up to the language input breakpoint have created an error relative to the grammar that defines acceptable language inputs,
wherein the language input analysis is stopped before reaching the language input breakpoint if the grammar breakpoint is reached beforehand; and
an act of presenting the resulting output for each language input up to the first-reached breakpoint, such that as the user provides subsequent step inputs, the interactive development environment successively steps through each input and presents its corresponding output up to the next language input or grammar breakpoint, wherein presenting the resulting output for each language input includes simultaneously presenting, for each language input:
an indication within the language input receiving area of a present language input that is being parsed by the parser,
an indication within the grammar input receiving area of at least one grammar rule that is being applied to the present language input, the indication visually distinguishing the at least one grammar rule that is being applied to the present language input from other grammar inputs, and
the corresponding resulting output in the parse output area.

15. The system of claim 14, wherein the resulting output comprises a tree of parsed outputs.

16. The system of claim 14, wherein the user modifies at least one of the breakpoints during debugging operation.

17. A computer system comprising the following:
one or more processors;
system memory; and
one or more computer-readable storage media having stored thereon computer-executable instructions that, when executed by the one or more processors, causes the computing system to perform a method for providing debugging functionality for debugging a programming language within an interactive development environment, the method comprising the following:
an act of displaying an interactive development environment including a programming language grammar input receiving area that allows a user to view and interact with grammar inputs defining a particular programming language, a programming language input receiving area that allows the user to view and interact with programming language inputs that use the particular programming language as defined by the grammar inputs, and a parse output area that allows the user to view the current state of a parser, wherein the grammar input receiving area, the language input receiving area, and the parse output area are each displayed simultaneously;
an act of receiving a step input from the user indicating that the interactive development environment is to begin stepping through each language input to determine whether the language inputs have created an error relative to the grammar that defines acceptable language inputs; and an act of presenting the resulting output for each language input, such that as the user provides subsequent step inputs, the interactive development environment successively steps through each language input and simultaneously presents, at each step:

an indication within the language input receiving area of a present language input that is being parsed by the parser, an indication within the grammar input receiving area of at least one grammar rule that is being applied to the present language input, the indication visually distinguishing the at least one grammar rule that is being applied to the present language input from other grammar inputs, and corresponding output in the parse output area.

18. The system of claim 17, further comprising presenting an additional debugger output area that displays the output generated by the interactive development environment's debugging engine.

19. The system of claim 17, wherein the presented corresponding output indicates why at least one present grammar rule is being applied to a corresponding present language input.

20. The method of claim 17, further comprising presenting an additional output area that includes a representation of the parsing path taken by the parser.

21. A computer program product comprising one or more computer-readable hardware storage devices having stored thereon computer-executable instructions that, when executed by one or more processors of a computer system, cause the computer system to implement a method for providing debugging functionality for debugging a programming language within an interactive development environment, including:

displaying an interactive development environment including a programming language grammar input receiving area that allows a user to view and interact with grammar inputs defining a particular programming language, a programming language input receiving area that allows the user to view and interact with programming language inputs that use the particular programming language as defined by the grammar inputs, and a parse output area that allows the user to view the current state of a parser, wherein the grammar input receiving area, the language input receiving area, and the parse output area are each displayed simultaneously;

receiving a step input from the user indicating that the interactive development environment is to begin stepping through each language input to determine whether the language inputs have created an error relative to the grammar that defines acceptable language inputs; and presenting the resulting output for each language input, such that as the user provides subsequent step inputs, the interactive development environment successively steps through each language input and simultaneously presents, at each step:

an indication within the language input receiving area of a present language input that is being parsed by the parser, an indication within the grammar input receiving area of at least one grammar rule that is being applied to the present language input, the indication visually distinguishing the at least one grammar rule that is being applied to the present language input from other grammar inputs, and corresponding output in the parse output area.

22. At a computer system including a processor and system memory, a computer-implemented method for providing debugging functionality for a programming language within an interactive development environment, the method comprising the following:

an act of instantiating an interactive development environment configured for dynamically presenting at least a programming language grammar input receiving area that allows a user to view and interact with grammar inputs defining a particular programming language, a programming language input receiving area that allows a user to view and interact with programming language inputs that use the particular programming language as defined by the grammar inputs, and a parse output area, wherein the interactive development environment allows a user to step through each language input and observe the resulting output for each input while designing the particular programming language itself, and wherein the grammar input receiving area, the language input receiving area, and the parse output area are each displayed simultaneously;

an act of receiving an indication from the user indicating that the interactive development environment is to begin debugging at an indicated point in the language input;

an act of receiving inputs from a user indicating that breakpoints are to be added at both an indicated point in the language inputs and at an indicated point in the grammar input receiving area;

an act of analyzing the language inputs in the language input receiving area to determine whether the inputs up to the language input breakpoint have created an error relative to the grammar that defines acceptable language inputs, wherein the language input analysis is stopped before reaching the language input breakpoint if the grammar breakpoint is reached beforehand; and an act of presenting the resulting output for each language input up to the first- reached breakpoint, such that as the user provides subsequent step inputs, the interactive development environment successively steps through each input and presents its corresponding output up to the next language input or grammar breakpoint, wherein presenting the resulting output for each language input includes simultaneously presenting, for each language input:

an indication within the language input receiving area of a present language input that is being parsed by the parser, an indication within the grammar input receiving area of at least one grammar rule that is being applied to the present language input, the indication visually distinguishing the at least one grammar rule that is being applied to the present language input from other grammar inputs, and the corresponding resulting output in the parse output area.

23. A computer program product comprising one or more computer-readable hardware storage devices having stored thereon computer-executable instructions that, when executed by one or more processors of a computer system, cause the computer system to implement a method for providing debugging functionality for a programming language within an interactive development environment, including the following:

instantiating an interactive development environment configured for dynamically presenting at least a programming language grammar input receiving area that allows a user to view and interact with grammar inputs defining a particular programming language, a programming language input receiving area that allows a user to view and interact with programming language inputs that use the particular programming language as defined by the grammar inputs, and a parse output area, wherein the interactive development environment allows a user to step through each language input and observe the resulting output for each input while designing the particular programming language itself, and wherein the grammar input receiving area, the language input receiving area, and the parse output area are each displayed simultaneously;

receiving an indication from the user indicating that the interactive development environment is to begin debugging at an indicated point in the language input;

receiving inputs from a user indicating that breakpoints are to be added at both an indicated point in the language inputs and at an indicated point in the grammar input receiving area;

analyzing the language inputs in the language input receiving area to determine whether the inputs up to the language input breakpoint have created an error relative to the grammar that defines acceptable language inputs, wherein the language input analysis is stopped before reaching the language input breakpoint if the grammar breakpoint is reached beforehand; and presenting the resulting output for each language input up to the first-reached breakpoint, such that as the user provides subsequent step inputs, the interactive development environment successively steps through each input and presents its corresponding output up to the next language input or grammar breakpoint, wherein presenting the resulting output for each language input includes simultaneously presenting, for each language input:

an indication within the language input receiving area of a present language input that is being parsed by the parser, an indication within the grammar input receiving area of at least one grammar rule that is being applied to the present language input, the indication visually distinguishing the at least one grammar rule that is being applied to the present language input from other grammar inputs, and the corresponding resulting output in the parse output area.

* * * * *